(12) United States Patent
Robertson et al.

(10) Patent No.: US 11,236,769 B2
(45) Date of Patent: Feb. 1, 2022

(54) METHOD FOR TIGHT CONTROL OF BOLT HOLES IN FAN ASSEMBLY

(71) Applicant: United Technologies Corporation, Farmington, CT (US)

(72) Inventors: Thomas J. Robertson, Glastonbury, CT (US); Mark W. Costa, Storrs, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 148 days.

(21) Appl. No.: 16/555,322

(22) Filed: Aug. 29, 2019

(65) Prior Publication Data

US 2020/0011348 A1 Jan. 9, 2020

Related U.S. Application Data

(62) Division of application No. 14/466,672, filed on Aug. 22, 2014, now Pat. No. 10,502,235.
(Continued)

(51) Int. Cl.
*F04D 29/64* (2006.01)
*F01D 25/24* (2006.01)
(Continued)

(52) U.S. Cl.
CPC .......... *F04D 29/644* (2013.01); *F01D 9/042* (2013.01); *F01D 25/243* (2013.01); *F01D 25/246* (2013.01); *F04D 29/522* (2013.01); *F05D 2220/32* (2013.01); *F05D 2230/23* (2013.01); *F05D 2230/30* (2013.01);
(Continued)

(58) Field of Classification Search
CPC ........ F01D 25/24; F01D 25/243; F01D 25/28; F01D 25/246; F04D 29/522
See application file for complete search history.

(56) References Cited

U.S. PATENT DOCUMENTS 4,010,519 A 3/1977 Worthing
5,272,869 A 12/1993 Dawson et al.
(Continued)

FOREIGN PATENT DOCUMENTS

DE 102011122449 A1 6/2013
EP 1515005 A2 3/2005
(Continued)

OTHER PUBLICATIONS

European Office Action for Application No. 17 159 722.2; dated Apr. 12, 2018 4 pages.
(Continued)

*Primary Examiner* — J. Todd Newton, Esq.
*Assistant Examiner* — Cameron A Corday
(74) *Attorney, Agent, or Firm* — Cantor Colburn LLP

(57) ABSTRACT

In a fan case having an annular outer wall with a plurality of fan case bolt holes there through, bushings are inserted into the fan case bolt hole and are dimensioned to define an annular gap between the bolt hole inner surface and the bushing outer surface. An adhesive material disposed within each annular gap between the bushing and the corresponding fan case bolt hole, with the adhesive material forming a liquid shim separating the bushing outer surface from the bolt hole inner surface.

6 Claims, 4 Drawing Sheets

Related U.S. Application Data

(60) Provisional application No. 61/900,788, filed on Nov. 6, 2013.

(51) Int. Cl.
  *F01D 9/04* (2006.01)
  *F04D 29/52* (2006.01)

(52) U.S. Cl.
  CPC ...... *F05D 2230/41* (2013.01); *F05D 2230/60* (2013.01); *F05D 2260/31* (2013.01); *Y02T 50/60* (2013.01)

(56) References Cited

U.S. PATENT DOCUMENTS

| | | | |
|---|---|---|---|
| 5,275,529 A * | 1/1994 | Langenbrunner | F16B 5/01 415/119 |
| 5,297,932 A | 3/1994 | Johnson | |
| 6,200,223 B1 | 3/2001 | Martens | |
| 7,588,418 B2 | 9/2009 | Maier et al. | |
| 8,998,578 B2 | 4/2015 | Rauch et al. | |
| 2012/0213633 A1 | 8/2012 | Samuelsson et al. | |
| 2016/0245308 A1 | 8/2016 | Robertson et al. | |
| 2017/0146018 A1 | 5/2017 | Chow et al. | |

FOREIGN PATENT DOCUMENTS

| | | |
|---|---|---|
| EP | 1726788 A2 | 11/2006 |
| EP | 2339144 A2 | 6/2011 |
| WO | 2011053198 A1 | 5/2011 |
| WO | 2015026798 A1 | 2/2015 |

OTHER PUBLICATIONS

European Search Repod for Application No. EP 14 19 1130 6 pages.
European Search Repod for EP Application No. EP 17 15 9722 8 pages.

* cited by examiner

METHOD FOR TIGHT CONTROL OF BOLT HOLES IN FAN ASSEMBLY

CROSS REFERENCE TO RELATED APPLICATIONS

This application is a division of U.S. patent application Ser. No. 14/466,672 filed on Aug. 22, 2014, which claims priority under 35 U.S.C. § 119(e) to U.S. Provisional Patent Application Ser. No. 61/900,788 filed on Nov. 6, 2013, the contents each of which are incorporated herein by reference thereto.

TECHNICAL FIELD

This disclosure relates generally to bolt holes for use in connecting components of assemblies, and in particular to an arrangement of bolt holes and a method for maintaining tight control of installing and aligning the arrangement, particularly in fan assemblies for gas turbine engines.

BACKGROUND

It is well known to use bolts to fasten assembly components together. Typically, bolt fastening requires bolt holes in each of the connected components that are aligned so the bolt may be inserted there through. Additional complexity may be introduced where multiple bolts are used to fasten the components. The bolt holes through each component must be arranged in corresponding patterns that align during assembly so that all bolts may be inserted though the bolt holes. Consequently, the relatively basic use of bolts to fasten assembly components may become more complex and require greater precision in particular implementations.

In one such implementation in gas turbine engines, fan structural guide vanes are used to provide air flow control between a fan containment case and forward mounts to the front center body and core. Connection of the guide vanes requires tightly controlled bolt holes to effectively transfer shear loads from the guide vanes to the fan case. It has been observed that holding small clearances within a pattern of bolts requiring precise spacing effectively distributes shear among all fasteners within the pattern. It is difficult on a large assembly such as a fan case, where multiple materials make up a bolt stack, to control hole sizes and positional tolerance to levels required to align the fan case bolt holes to the corresponding bolt holes of the guide vanes to provide the designed shear load sharing. It is undesirable to line drill holes in the fan case at assembly due to part replacement requirements. Moreover, in some implementations, bushings are inserted through the bolt holes of the fan case and provide the primary bearing surfaces for shear stresses that are distributed to the fan case. Where the fan case is fabricated from metal, the bushings may be press fit into the bolt holes without damaging the fan case. As the design of fan cases transitions to the use of composite materials, press fitting of bushings into the bolt holes through the composite material wall can cause local cracking that can compromise the integrity of the fan case.

In view of the foregoing, a need exists for an improved arrangement in certain assemblies for tightly controlled bolt hole installation, and for methods for maintaining the tight control of the bolt holes during construction of the assemblies.

SUMMARY OF THE DISCLOSURE

In one aspect of the present disclosure, a fan case assembly is disclosed. The fan case assembly includes a fan case having an annular outer wall having a plurality of fan case bolt holes there through, wherein each of the plurality of fan case bolt holes has a bolt hole inner surface having a bolt hole inner diameter. The fan case assembly further includes a plurality of bushings each having a cylindrical body having a bushing inner surface defining a cylindrical bore having a bushing inner diameter and a bushing outer surface with a bushing outer diameter that is less than the bolt hole inner diameter, wherein the cylindrical body of each of the plurality of bushings is inserted into a corresponding one of the plurality of fan case bolt holes with an annular gap being defined between the bolt hole inner surface and the bushing outer surface. The fan case assembly also includes an adhesive material disposed within each annular gap between one of the plurality of bushings and the corresponding one of the plurality of fan case bolt holes, wherein the adhesive material forms a liquid shim separating the bushing outer surface from the bolt hole inner surface of the corresponding one of the plurality of fan case bolt holes.

In another aspect of the present disclosure, a bolt hole arrangement for a structural support component of a component assembly having a first surface and a second surface is disclosed. The bolt hole arrangement includes a bolt hole inner surface of the structural support component defining a structural support component bolt hole having a bolt hole inner diameter extending through the structural support component from the first surface to the second surface. The bolt hole arrangement further includes a bushing having a cylindrical body with a bushing inner surface defining a cylindrical bore having a bore inner diameter and a bushing outer surface with a bushing outer diameter that is less than the bolt hole inner diameter, wherein the cylindrical body of the bushing is inserted into the structural support component bolt hole with an annular gap being defined between the bolt hole inner surface and the bushing outer surface. The bolt hole arrangement also includes an adhesive material disposed within the annular gap between the bushing and the structural support component bolt hole, wherein the adhesive material forms a liquid shim separating the bushing outer surface from the bolt hole inner surface.

In a further aspect of the present disclosure, a method for forming a bolt hole arrangement for an annular wall having an outer surface, an inner surface, and a bolt hole inner surface defining an annular wall bolt hole extending through the annular wall from the inner surface to the outer surface and having a bolt hole inner diameter is disclosed. The method for forming the bolt hole arrangement includes positioning a guide plate against the inner surface of the annular wall with a guide bolt hole of the guide plate substantially axially aligned with the annular wall bolt hole, where the guide plate has a shape that is complimentary to a shape of the inner surface of the annular wall, and wherein the guide bolt hole has a guide hole inner diameter that is less than the bolt hole inner diameter. The method for forming the bolt hole arrangement further includes applying an adhesive material to a bushing outer surface of a bushing having a cylindrical body with the bushing outer surface having a bushing outer diameter that is less than the bolt hole inner diameter and a bushing inner surface defining a cylindrical bore of the bushing having a bushing inner diameter that is approximately equal to the guide hole inner diameter, and inserting the bushing into the annular wall bolt hole through the outer surface of the annular wall. The method for forming the bolt hole arrangement also includes inserting a guide bolt through the guide bolt hole and through the annular wall bolt hole through the inner surface, wherein the guide bolt engages the bushing inner surface to axially align the bushing with the annular wall bolt hole with an annular gap being formed between the bushing outer surface and the bolt hole inner surface with the adhesive material disposed within the annular gap, and allowing the adhesive material to harden and form a liquid shim separating the bushing outer surface from the bolt hole inner surface.

Additional aspects are defined by the claims of this patent.

DETAILED DESCRIPTION

Although the following text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

Figure 1:
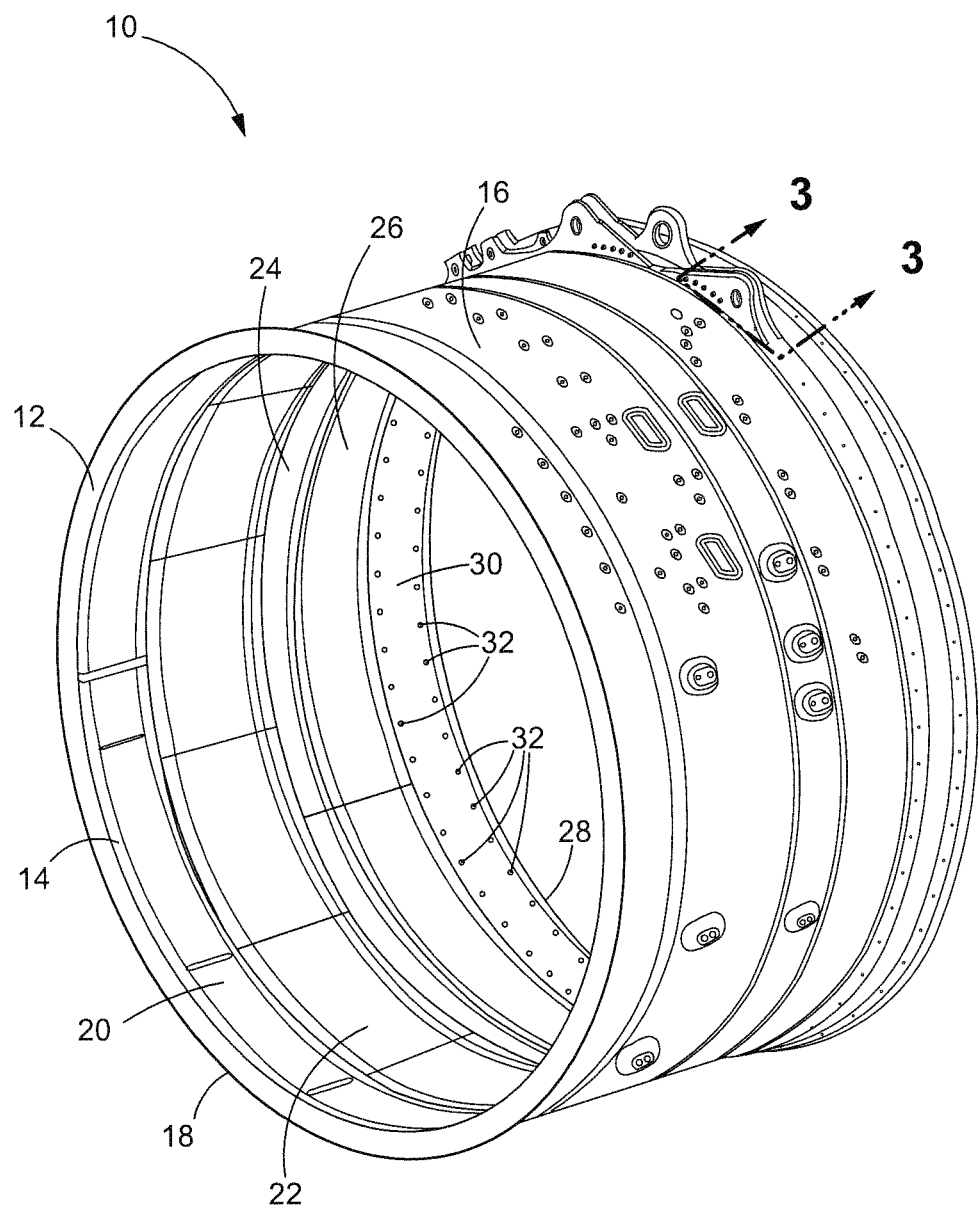
FIG. 1 is a perspective view of a fan case for a gas turbine engine.

FIG. 1 illustrates an exemplary environment in which bolt holes and tight control of bolt holes in accordance with the present disclosure may be implemented in the form of a fan case 10 of a gas turbine engine for a commercial aircraft. Other environments wherein bolt holes as illustrated and described herein may be implemented will be apparent to those skilled in the art. The fan case 10 may be formed by an annular wall 12 formed from an appropriate metal or composite material. The annular wall 12 may have a fan case inner surface 14 and a fan case outer surface 16 that are contoured and subdivided as necessary to divide the fan case 10 into sections performing functions to increase the performance of the engine. For example, a front section proximate a leading edge 18 of the fan case 10 may have an acoustic liner 20 on the fan case inner surface 14 to reduce vibration and noise in the engine. The fan case inner surface 14 at an adjacent may be coated with a fan blade abradable material 22, such as an epoxy or other appropriate a breathable material. The abradable material 22 may allow close clearances between the fan case inner surface 14 and the fan blades (not shown), and they automatically adjust the clearance in response to physical events and/or thermal variations during the operation of the engine.

The next section after of the abradable material 22 may include a reinforced face sheet or ice liner 24 applied to the fan case inner surface 14. At high altitudes, or in cold weather, ice may form and be projected rearward by the fan blades. The ice liner 24 may absorb the impact of the ice to prevent damage to the fan case inner surface 14 of the fan case 10 behind the fan blades. After the ice liner 24, an additional acoustic treatment 26 may be applied to the fan case inner surface 14 for additional noise and vibration reduction.

Proximate a trailing or aft edge 28 of the fan case 10, a fan structural guide vane section 30 may be provided for attachment of guide vanes (not shown) that will redirect or straighten the air projected by the fan blades and exiting the engine. The guide vanes are mounted to the fan case 10 in a manner discussed more fully below. Because the guide vanes are mounted to the fan case 10, the guide vanes are non-rotating and remain stationary with respect to the fan case 10. The fan structural guide vane section 30 is provided with a plurality of generally circumferentially spaced bolt holes 32 extending through the annular wall 12 from the fan case inner surface 14 to the fan case outer surface 16. The bolt holes 32 are spaced and arranged to correspond to bolt holes of the guide vanes so that the guide vanes are uniformly spaced about the fan case 10.

Figure 2:
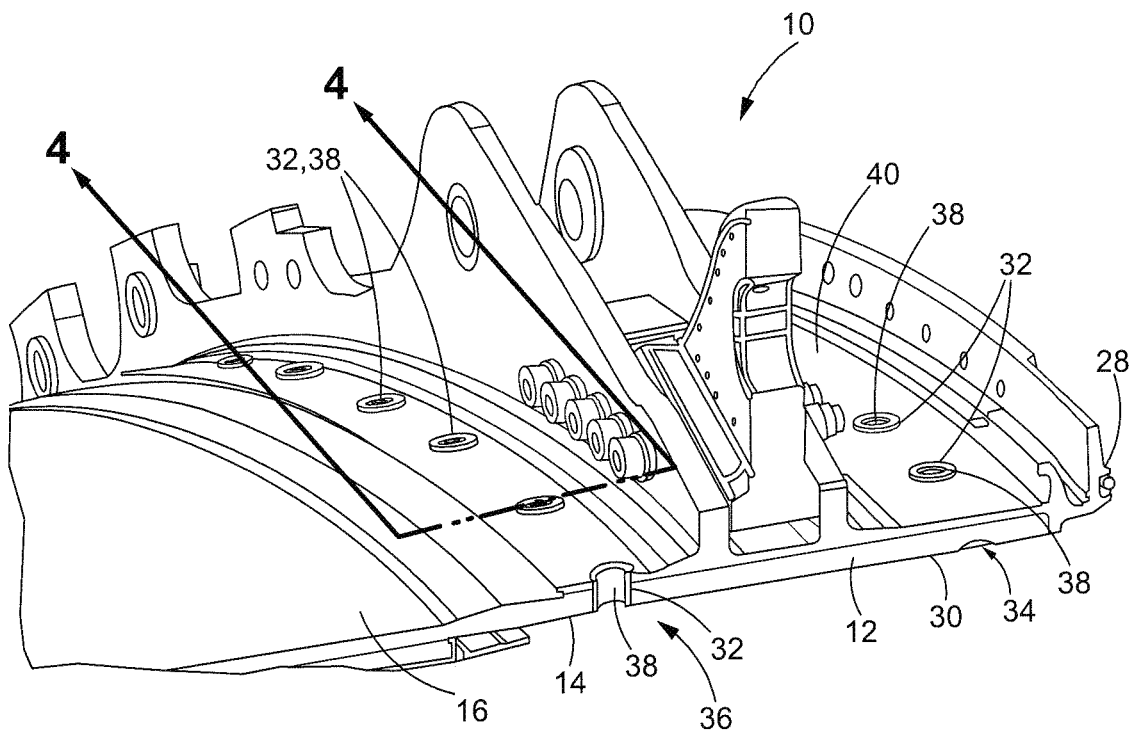
FIG. 2 is a partial cut away view of a portion of an annular wall of the fan case of FIG. 1.

FIG. 2 is a partial cut-away view showing a portion of the fan structural guide vane section 30 in greater detail. In the illustrated fan case 10, the bolt holes 32 are arranged in a first or aft bolt hole row 34 parallel to and proximate the aft edge 28 of the fan case 10, and a second or forward bolt hole row 36 axially forward of the aft edge 28 and the aft bolt hole row 34. Of course, other arrangements of the bolt holes 32 may be provided depending on the configuration of the guide vanes and corresponding bolt holes. Each bolt hole 32 may have a corresponding bushing 38 installed therein to provide additional support for withstanding the shear stresses on the bolts (not shown) when the engine is operating. Further, an annular outer sleeve 40 with additional components of the engine may be installed over the fan structural guide vane section 30. In alternate embodiments of the fan case 10, the outer sleeve 40 and/or the additional components may be integrally formed with the annular wall 12.

Figure 3:
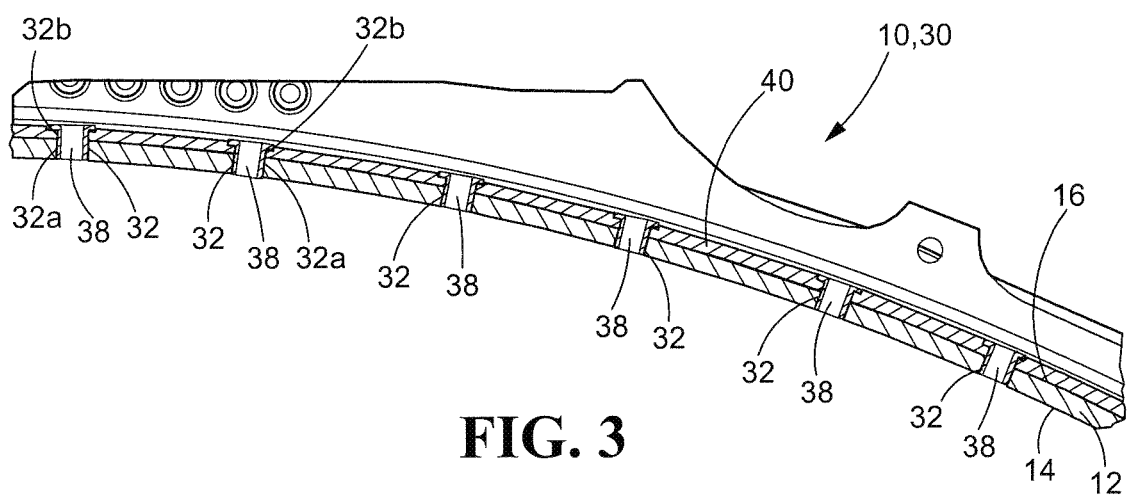
FIG. 3 is a cross-sectional view taken through line 3-3 of FIG. 1 of a portion of the annular wall of the fan case of FIG. 1 illustrating a series of arrangements of bolt holes and corresponding bushings in a structural guide vane section of the fan case in accordance with the present disclosure.

The forward bolt hole row 36 of bolt holes 32 is shown in greater detail in the cross sectional view of FIG. 3. Each bolt hole 32 has a first or inner portion 32a through the annular wall 12 of the fan case 10, and a second or outer portion 32b through the outer sleeve 40. The bolt hole portions 32a, 32b may be formed in the annular wall 12 and the outer sleeve 40 before the outer sleeve 40 is installed, with the bolt hole portions 32a, 32b being aligned when the outer sleeve 40 is installed on the fan structural guide vane section 30 to allow insertion of the bushings 38 into the bolt holes 32. Alternatively, the bolt hole portions 32a, 32b may be drilled or otherwise formed after the outer sleeve 40 is installed to ensure proper alignment of the bolt hole portions 32a, 32b. With the bolt hole portions 32a, 32b formed and axially aligned, the bushings 38 may be installed in the bolt holes 32.

Figure 4:
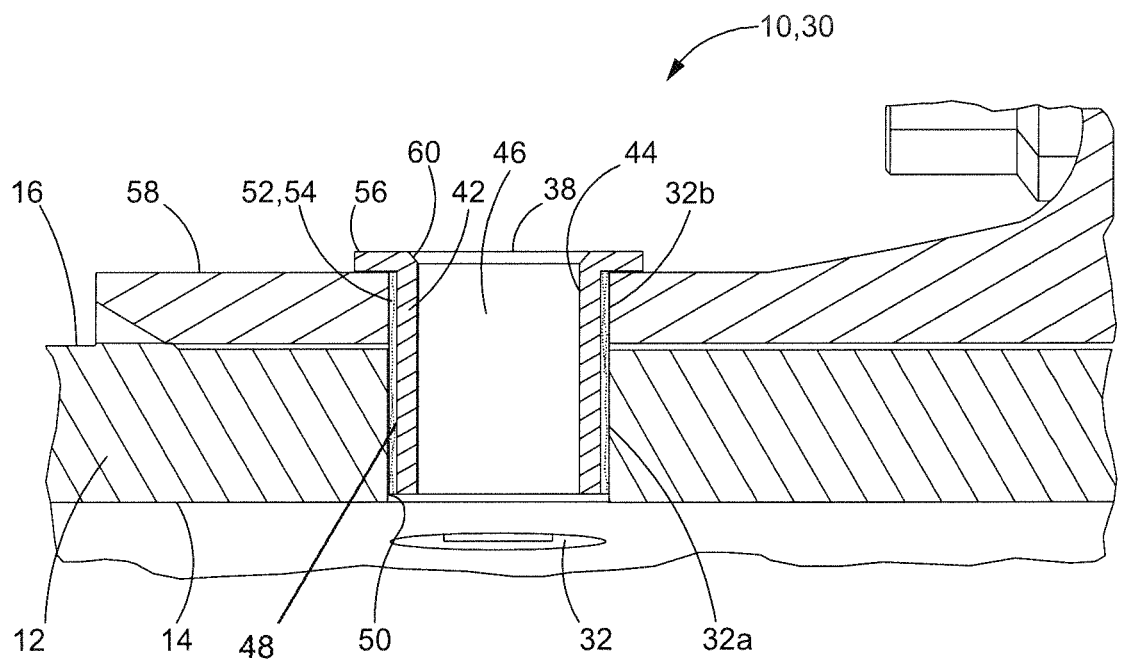
FIG. 4 is a cross-sectional view taken through line 4-4 of FIG. 2 of a portion of the structural guide vane section of the fan case of FIG. 1 illustrating a bolt hole and corresponding bushing arrangement in accordance with the present disclosure.

The configuration of the bolt holes 32 and the bushings 38 will be explained with reference to the cross-sectional view of FIG. 4. The bushing 38 has a generally hollow cylindrical body 42 having a bushing inner surface 44 defining a cylindrical bore 46 there through. The cylindrical bore 46 has a bore inner diameter sized to receive a corresponding faster (not shown). The cylindrical body 42 has a bushing outer surface 48 with a bushing outer diameter that is less than a bolt hole inner diameter of a bolt hole inner surface 50 so that an annular gap 52 exists between the bolt hole inner surface 50 and the bushing outer surface 48. To retain the bushing 38 within the bolt hole 32 and maintain the annular gap 52 there between, the annular gap 52 is filled by a liquid shim 54. The liquid shim 54 may be formed by an epoxy paste adhesive or other appropriate type of adhesive with sufficient strength to retain the bushing 38 within the bolt hole 32 and sufficient substance to prevent lateral movement of the bushing 38 within the bolt hole 32. For example, the liquid shim 54 may be formed using an appropriate Loctite® Hysol® epoxy structural adhesive manufactured by the Henkel Corporation. Such adhesives have a paste or peanut butter-like consistency when applied to the bushing outer surface 48 and will not leak out of the bolt hole 32 before hardening to form the liquid shim 54.

Proximate a top edge of the cylindrical body 42, a flange 56 may extend radially outwardly from the cylindrical body 42. The flange 56 may have a flange outer diameter that is greater than the bolt hole inner diameter so that the flange 56 overlies a portion of a sleeve outer surface 58 of the outer sleeve 40 surrounding the bolt hole 32. The flange 56 prevents the bushing 38 from falling through the bolt hole 32, and provides a washer surface for the corresponding fastener. Also the top edge of the cylindrical body 42, the bushing inner surface 44 defines a lead-in chamfer 60 that assists in directing an end of the fastener into the cylindrical bore 46 during assembly.

Figure 5:
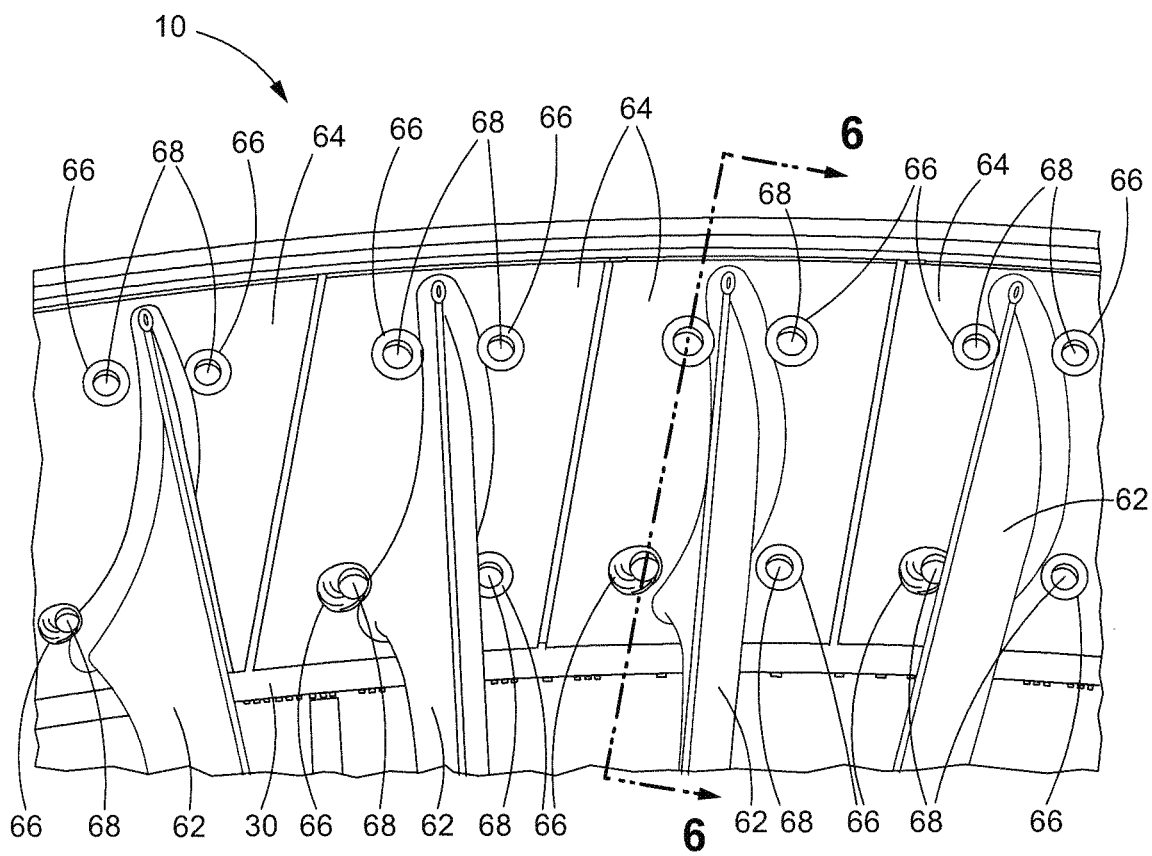
FIG. 5 is a perspective view from an interior of the fan case of a portion of the structural guide vane section of the fan case of FIG. 1 and corresponding installed structural guide vanes.

A view from the interior of the fan case 10 with structural guide vanes 62 installed is provided in FIG. 5. As seen in the drawing figure, the structural guide vanes 62 have the general shape of airfoils and are configured to receive the air projected by the fan blades and redirect the airflow reward and out through the aft opening of the fan case 10. In this embodiment, each structural guide vane 62 has a corresponding guide vane base 64 with four base bolt holes 66 receiving corresponding fasteners 68 to anchor the structural guide vane 62 to the fan structural guide vane section 30 of the fan case 10. For each of the guide vane bases 64, two of the base bolt holes 66 axially align with bolt holes 32 of the fan case 10 along the aft bolt hole row 34, and the other two base bolt holes 66 axially align with bolt holes 32 along the forward bolt hole row 36 of bolt holes 32. The sets of four fasteners 68 per structural guide vane 62 are controlled to tight positioning and sizes to facilitate effective shear load transfer from the guide vane bases 64 to the annular wall 12 of the fan case 10.

Figure 6:
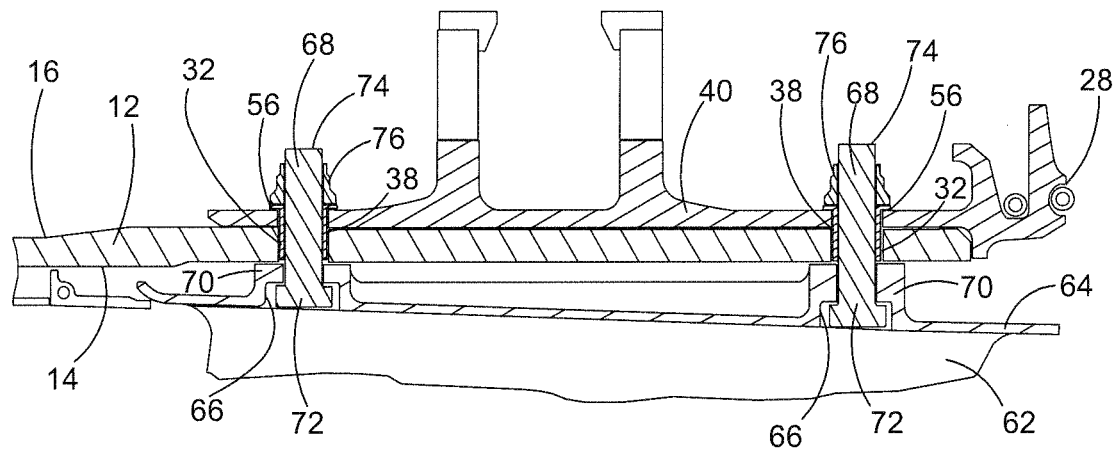
FIG. 6 is a cross-sectional view taken through line 6-6 of FIG. 5 of the structural guide vane section of the fan case of FIG. 1 and corresponding installed structural guide vane.

The fan case 10 and an assembled structural guide vane 62 are shown in greater detail in the cross-sectional view of FIG. 6. The guide vane base 64 may include support posts 70 extending outwardly from the guide vane base 64 at each of the base bolt holes 66 to properly orient the structural guide vane 62 with respect to the fan case inner surface 14 of the annular wall 12. Ends of the support posts 70 abut the fan case inner surface 14 of the annular wall 12 with the base bolt holes 66 axially aligned with the corresponding bolt holes 32 and bushings 38 of the fan case 10. The base bolt holes 66 may have a base bolt hole inner diameter that is approximately equal to the bore inner diameter of the cylindrical bores 46 of the cylindrical bodies 42 of the bushings 38. With the base bolt holes 66 axially aligned with the fan case bolt holes 32, the corresponding fasteners 68 may be inserted through the bolt holes 32, 66 from the inside of the fan case 10 until heads 72 of the fasteners 68 engage the surfaces defining the base bolt holes 66 and opposite ends 74 extend beyond the outer sleeve 40. The exposed ends 74 of the fasteners 68 are then received by securement members, such as nuts 76 as shown, to securely retain the fasteners 68 within the bolt holes 32, 66 and hold the structural guide vane 62 in place. When the nuts 76 are tightened down on the fasteners 68, the flanges 56 of the corresponding bushings 38 act as washers and distribute the downward load created by each nut 76 across the portion of the fan case outer surface 16 of the annular wall 12 surrounding the fan case bolt hole 32.

INDUSTRIAL APPLICABILITY

In the fan case assemblies as illustrated and described above, as well as in other applications where components are connected to each other by fasteners, tight control of the locations of the bolt holes 32, 66 is required to ensure that the components are securely fastened together and that loads will be distributed between the components as intended in the design. Through the use of the liquid shim 54 formed by the adhesive material, the bolt holes 32 and the cylindrical bodies 42 of the bushings 38 may be fabricated with looser tolerances than in previous bolt hole and bushing arrangements. The difference between the bolt hole inner diameter and the bushing outer diameter may be greater and allow the presence of the annular gap 52 there between because the liquid shim 54 formed there between is capable of transferring shear loads from the corresponding structure guide vane through the fastener 68 to the annular wall 12 of the fan case 10 without the necessity of direct contract between the bushing outer surface 48 and the bolt hole inner surface 50.

In previous implementations, the difference between the bolt hole inner diameter and the bushing outer diameter may have been very tight to prevent substantial relative movement of the bushing 38 within the bolt hole 32. Such movement and repetitive engagement between the bushing outer surface 48 and bolt hole inner surface 50 could lead to fatigue and early failure of the components. However, the tighter tolerance may also result in the differences being small enough that press fitting of the bushing 38 into the bolt hole 32 would be required. Where the fan case 10 is fabricated from composite materials instead of metals, press fitting of the bushing 38 can lead to localized cracking in the annular wall 12 and, as with the repetitive engagement, early failure of the fan case 10 at the bolt holes 32. Use of the liquid shim 54 in accordance with the present disclosure eliminates excess movement of the bushing 38 without the necessity of fabricating the cylindrical body 42 of the bushing 38 to a bushing outer diameter that may cause an interference fit with the bolt hole inner surface.

While the liquid shim 54 provides protection and force transfer when properly installed, improper installation can result in direct contact between the bushing outer surface 48 and the bolt hole inner surface 50, and axial misalignment of the cylindrical bore 46 of the bushing 38 and the corresponding base bolt hole 66. The need for proper axial alignment is more acute in implementations such as that shown herein where each structural guide vane 62 is attached to the fan case 10 by four fasteners 68 that each require proper axial alignment of the bushings 38 within the bolt holes 32. For this reason, it is important to have a reliable installation process ensuring proper axial alignment of the bushings 38 both individually and relative to the other bushings 38 that will be used in securing the structural guide vane 62 to the fan case 10.

Figure 7:
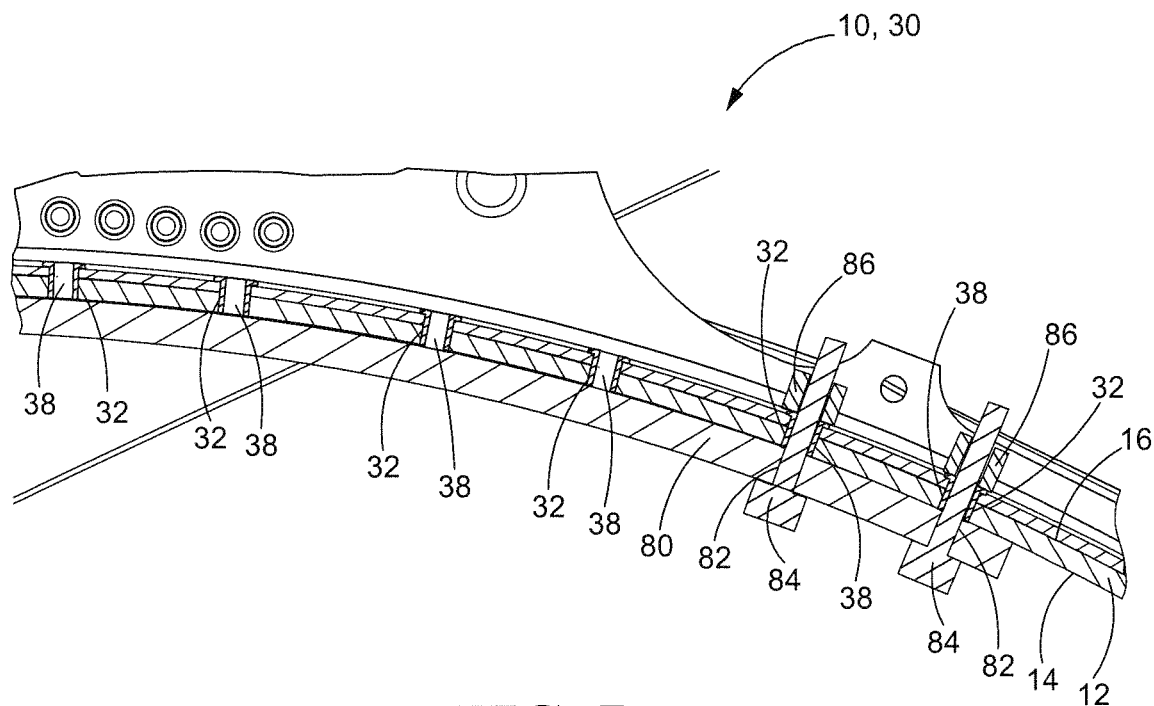
FIG. 7 is the cross-sectional view taken through line 3-3 of FIG. 1 of the portion of the annular wall of the fan case of FIG. 1 and series of bolt holes, and a bushing installation arrangement in accordance with the present disclosure.

FIG. 7 illustrates an exemplary bushing alignment arrangement for ensuring that the four bushings 38 used in securing one of the structural guide vanes 62 to the fan case 10. The bushing alignment arrangement may include a guide plate 80 shaped to correspond to the contour of the fan case inner surface 14 of the fan case 10. The guide plate 80 may include a plurality of guide bolt holes 82 positioned to axially align with corresponding bolt holes 32 of the annular wall 12. In one embodiment, the number and positions of the guide bolt holes 82 correspond to the number and positions of the base bolt holes 66 of one of the guide vane bases 64, and may have a guide bolt hole inner diameter that is approximately equal to the bore inner diameter of the bushing 38. In alternative embodiments, guide bolt holes 82 may be provided for simultaneous installation of as many bushings 38 as practical, including simultaneous installation of all the bushings 38 of the fan case 10 without the necessity of positioning and repositioning the guide plate 80 for successive installation of sets of the bushings 38. The guide bolts 84 are configured for insertion through the guide bolt holes 82 and the cylindrical bores 46 of the bushings 38 and have a guide bolt outer diameter allowing insertion of the guide bolts 84 without substantial movement between the guide bolts 84 and the bushings 38 in which they are inserted. The bushing alignment arrangement may further include guide bolt nuts 86 that are screwed or otherwise attached to the guide bolts 84 to engage the flanges 56 of the bushings 38 and hold the bushings 38 in place as the adhesive compound hardens to form the liquid shims 54 between the bolt holes 32 and bushings 38.

During preparation of the fan case 10 for attachment of the structural guide vanes 62, the guide plate 80 may be positioned against the fan case inner surface 14 of the annular wall 12 with the guide bolt holes 82 substantially axially aligned with the corresponding bolt holes 32 of the annular wall 12. The adhesive compound may be applied to the bushing outer surfaces 48 of the cylindrical bodies 42, and the cylindrical bodies 42 may be inserted into the corresponding bolt holes 32 through the fan case outer surface 16 with the flanges 56 facing and abutting the fan case outer surface 16. With the bushings 38 inserted in the bolt holes 32, the guide bolts 84 may be inserted into the guide bolt holes 82 and the cylindrical bores 46 from the inside of the fan case 10. Alternatively, the guide bolts 84 may be inserted first, followed by the insertion of the bushings 38 with the adhesive compound applied thereto. Due to the positioning of the guide bolt holes 82, the guide bolts 84 position the bushing outer surfaces 48 of the cylindrical bodies 42 away from the bolt hole inner surface 50 to form the annular gaps 52 there between. After the guide bolts 84 are inserted, the guide bolt nuts 86 may be installed to prevent axial movement of the bushings 38 as the adhesive compound hardens to form the liquid shims 54. After sufficient time for the liquid shims 54 to form, the guide bolt nuts 86 and guide bolts 84 may be removed and the guide plate 80 may be repositioned on the fan case inner surface 14 of the annular wall 12 for installation of the next set of bushings 38.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. A method for forming a bolt hole arrangement for an annular wall having an outer surface, an inner surface, and a bolt hole inner surface defining an annular wall bolt hole extending through the annular wall from the inner surface to the outer surface and having a bolt hole inner diameter, the method comprising:

positioning a guide plate against the inner surface of the annular wall with a guide bolt hole of the guide plate substantially axially aligned with the annular wall bolt hole, wherein the guide plate has a shape that is complimentary to a shape of the inner surface of the annular wall, and wherein the guide bolt hole has a guide hole inner diameter that is less than the bolt hole inner diameter;

applying an adhesive material to a bushing outer surface of a bushing having a cylindrical body with the bushing outer surface having a bushing outer diameter that is less than the bolt hole inner diameter and a bushing inner surface defining a cylindrical bore of the bushing having a bushing inner diameter that is approximately equal to the guide hole inner diameter;

inserting the bushing into the annular wall bolt hole through the outer surface of the annular wall;

inserting a guide bolt through the guide bolt hole and through the annular wall bolt hole through the inner surface, wherein the guide bolt engages the bushing inner surface to axially align the bushing with the annular wall bolt hole with an annular gap being formed between the bushing outer surface and the bolt hole inner surface with the adhesive material disposed within the annular gap; and allowing the adhesive material to harden and form a liquid shim separating the bushing outer surface from the bolt hole inner surface.

2. The method for forming a bolt hole arrangement according to claim 1, wherein the annular wall comprises a plurality of bolt hole inner surfaces defining a corresponding plurality of annular wall bolt holes, and the guide plate comprises a plurality of guide bolt holes positioned to simultaneously axially align with corresponding ones of the plurality of annular wall bolt holes, the method comprising positioning the guide plate against the inner surface of the annular wall with the plurality of guide bolt holes simultaneously axially aligned with the corresponding plurality of annular wall bolt holes.

3. The method for forming a bolt hole arrangement according to claim 1, comprising inserting the bushing into the annular wall bolt hole before inserting the guide bolt through the guide bolt hole and through the annular wall bolt hole through the inner surface.

4. The method for forming a bolt hole arrangement according to claim 1, comprising inserting the guide bolt through the guide bolt hole and through the annular wall bolt hole through the inner surface before inserting the bushing into the annular wall bolt hole.

5. The method for forming a bolt hole arrangement according to claim 1, comprising installing a guide bolt nut on an end of the guide bolt proximate to the outer surface of the annular wall to engage the bushing and prevent the bushing from moving axially out of the annular wall bolt hole.

6. The method for forming a bolt hole arrangement according to claim 1, wherein the bushing has a top edge and comprises a flange extending radially outwardly from the cylindrical body at the top edge and having a flange outer diameter that is greater than the bolt hole inner diameter, wherein the flange of the bushing engages the outer surface of the annular wall surrounding the annular wall bolt hole.

* * * * *